United States Patent [19] [11] 4,421,343
Yoshitsugu et al. [45] Dec. 20, 1983

[54] KNEE PANEL FOR FRONT SEAT AND KNEE PANEL MOUNTING STRUCTURE FOR VEHICLE

[75] Inventors: Noritada Yoshitsugu; Atsuo Ando, both of Toyota, Japan

[73] Assignee: Toyota Jidosha Kogyo Kabushiki Kaisha, Aichi, Japan

[21] Appl. No.: 215,336

[22] Filed: Dec. 11, 1980

[51] Int. Cl.³ ............................................. B60R 21/04
[52] U.S. Cl. .................................... 280/752; 180/90; 296/70; 296/192
[58] Field of Search ............... 280/732, 738, 743, 748, 280/749, 750, 751, 752; 180/90; 296/70, 192

[56] References Cited

U.S. PATENT DOCUMENTS

| 2,966,952 | 1/1961 | Wilfert | 180/90 |
| 3,439,769 | 4/1969 | Brilmeyer | 280/752 X |
| 3,801,126 | 4/1974 | Knight et al. | 180/90 X |
| 3,816,836 | 6/1974 | Smith | 180/90 X |
| 3,876,228 | 4/1975 | Hawkins et al. | 280/752 |
| 3,897,848 | 8/1975 | Arnston et al. | 180/90 |
| 3,904,222 | 9/1975 | Bursott et al. | 180/90 X |
| 3,930,664 | 1/1976 | Parr et al. | 180/90 X |
| 4,105,223 | 8/1978 | Oda et al. | 280/752 |

Primary Examiner—Joseph F. Peters, Jr.
Assistant Examiner—Mitchell J. Hill
Attorney, Agent, or Firm—Parkhurst & Oliff

[57] ABSTRACT

A knee panel for a front seat of a vehicle, located under an instrument panel for protecting a driver and a passenger riding on the front seat, and a knee panel mounting structure which minimizes the deformation and displacement of the knee panel and its supporting member, when the driver's and/or passenger's knees make contact with the inner surface of the knee panel, by bearing the impact force on a front pillar side through a side bracket and on a floor side thereof through an L-shaped bracket, thereby directing the impact force as the load toward both a ends of the L-shaped bracket.

4 Claims, 12 Drawing Figures

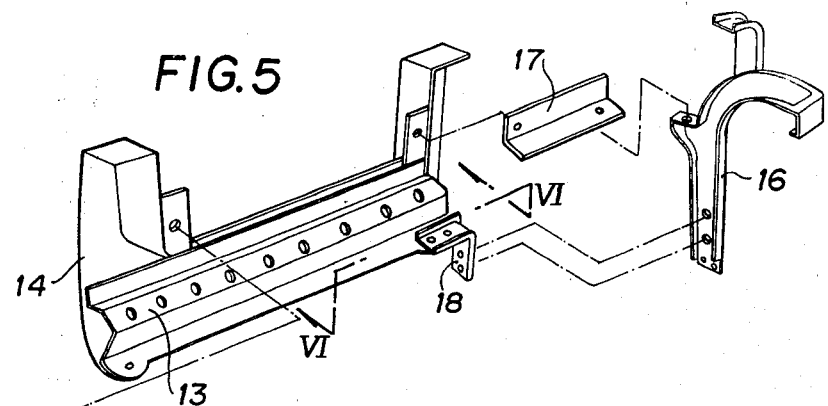
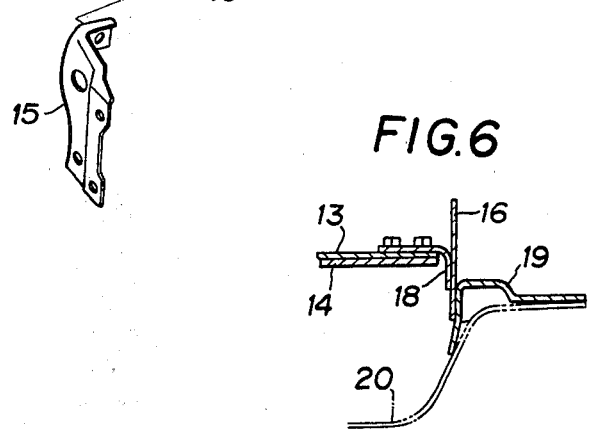
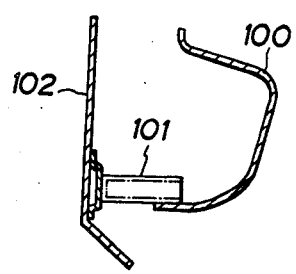
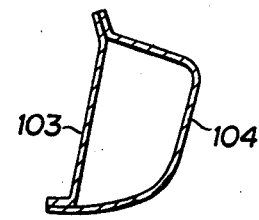

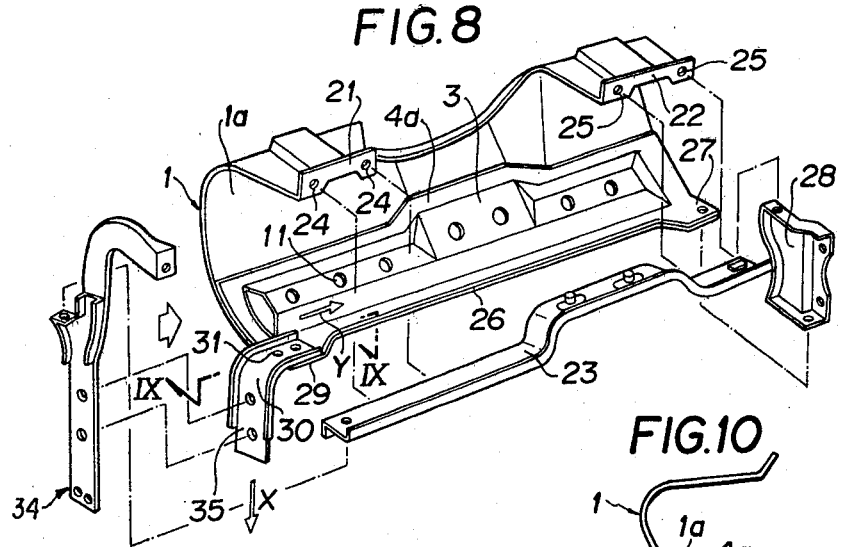
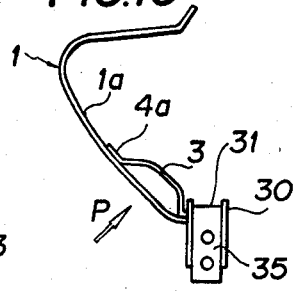
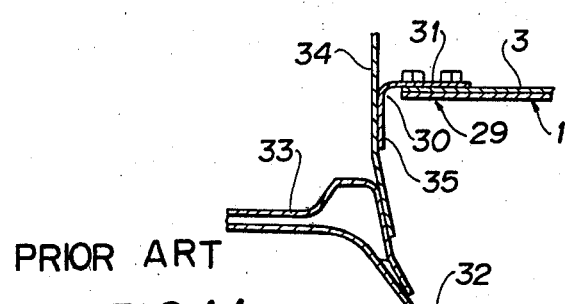
PRIOR ART
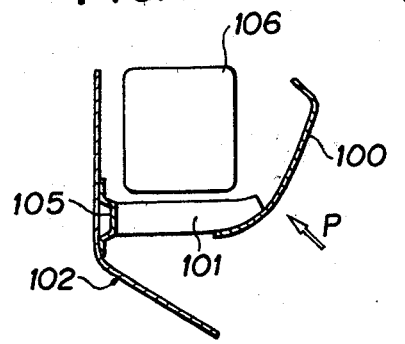

KNEE PANEL FOR FRONT SEAT AND KNEE PANEL MOUNTING STRUCTURE FOR VEHICLE

BACKGROUND OF THE INVENTION

This invention relates to a knee panel for a front seat and a knee panel mounting structure for a vehicle and, more particularly, to improvements in a knee panel located under an instrument panel for protecting a driver and a passenger riding on a front seat, and in a knee panel mounting structure for a vehicle.

The conventional knee panel of this type is designed, as shown in FIG. 7a, to have a simple convexly bent panel 100 fixed to a dash panel 102 by utilizing mounting frames 101 or as shown in FIG. 7b, to have a convexly bent panel 104 reinforced with a reinforcing member 103 to form a closed cross section. The knee panel of the type shown in FIG. 7a cannot be mounted on a number of mounting frames 101 due to the arrangement of auxiliary components for a cooler unit or the like. The knee panel of the type shown in FIG. 7b has a preferable reinforcing effect.

Further, the conventional knee mounting structure is in most cases designed, as shown in FIG. 11, to have a dash panel 102, a bracket 105 for mounting a brace fixed to the dash panel 102, a dash brace 101 secured to the bracket 105, and a knee panel 100 fixed through the dash brace 101 to the bracket 105.

One disadvantage of the conventional knee mounting design structure is that the distance from the dash panel 102 to the secured position of the knee panel 100 is relatively long, creating the disadvantages of an increase in the weight and loss of the mounting members. A further disadvantage is that the dash brace 101 cannot be properly arranged when a cooler unit 106 is located under the instrument panel.

SUMMARY OF THE INVENTION

Therefore, an object of the present invention is to provide a knee panel for a front seat of a vehicle which can eliminate the aforementioned disadvantages of the conventional knee panel and which can prevent local deformation of the knee panel upon contact of the driver's and/or passenger's knees with the knee panel, so that the advancement of the knees is suitably restricted and so that a substantially uniform contact load may be imparted to any given position on the knee panel. A further object of the present invention is to provide a knee panel for a front seat of a vehicle which has relatively light weight.

Yet another object of this invention is to provide a knee panel mounting structure for a vehicle which can eliminate the aforementioned disadvantages of the conventional knee panel mounting structure and can minimize the deformation and movement of the knee panel and its supporting member when the driver's and/or passenger's knees make contact with the inner surface of the knee panel by bearing the impact force on a front pillar side thereof through a side bracket and at the floor side thereof through an L-shaped bracket, thereby directing the impact force as a load toward both the ends of the L-shaped bracket, namely, the longitudinal direction of the bracket.

Still another object of the invention is to provide a knee panel mounting structure for a vehicle which is relatively simple in construction and light in weight.

Still another object of the invention is to provide a knee panel mounting structure for a vehicle which can retain a large interior space in front of and under the knee panel, convenient for thereby making the installation of a cooler unit or the like more convenient.

BRIEF DESCRIPTION OF THE INVENTION

The foregoing objects and other objects as well as the characteristic features of the invention will become more apparent and more readily understandable when the following description and the appended claims are read in conjunction with the accompanying drawings:

FIG. 5 is a perspective view of the unassembled coupling structure of another embodiment of the knee panel according to the invention;

FIG. 6 is a sectional view of the coupling structure taken along line VI—VI in FIG. 5, FIGS. 7a and 7b are lateral cross sectional views of a conventional knee panel;

FIG. 8 is an unassembled perspective view of one preferred embodiment of the knee panel mounting structure according to the present invention;

FIG. 9 is an enlarged sectional view of the mounting structure taken along the line IX—IX in FIG. 8;

FIG. 10 is a side view of the mounting structure shown in FIG. 8 as seen in a direction designated by an arrow in the left side portion; and FIG. 11 is a lateral cross sectional schematic view of the conventional knee panel mounting structure.

DESCRIPTION OF THE PREFERRED EMBODIMENTS

Figure 1:
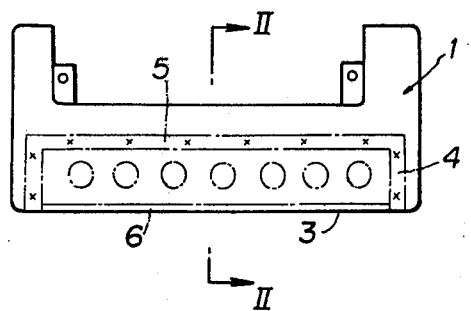
FIG. 1 is a front view of one preferred embodiment of a knee panel for a front seat of a vehicle constructed according to the invention.

Referring now to the drawings, particularly and to FIGS. 1 through 3 which show one preferred embodiment of the knee panel for a front seat of a vehicle constructed according to the present invention, wherein like reference numerals designate like parts in the following views, in FIG. 1 a knee panel 1 having a cross section which is convex towards a front seat of the vehicle is securely fixed to the lower portion of an instrument panel (not shown). The knee panel 1 comprises a reinforcing member 3 having substantially a dish shape in longitudinal cross section and securely fixed at all peripheral edges 4, 5 and 6 by a welding or the like to the lower inside portion 2 of the knee panel 1 along the length-wise direction of the knee panel 1. It should be noted that although the reinforcing member 3 in this embodiment is securely fixed at all of its peripheral edges 4, 5 and 6 to the knee panel 1 to form a closed cross section, the member 3 may also be securely fixed to knee panel as shown in FIG. 2, at only at the upper and lower edges 9 and 10 and be in an open state at both sides 7 and 8.

Figure 3:
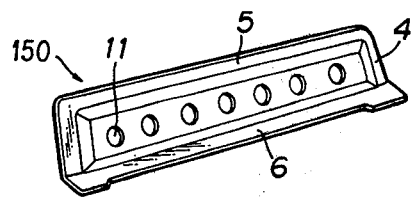
FIG. 3 is a perspective view of a reinforcing member for the knee panel.
Figure 4:
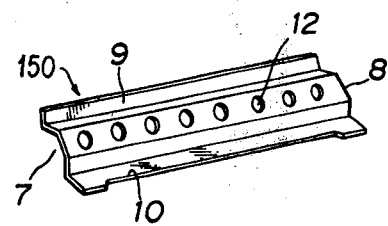
FIG. 4 is a perspective view of another example of the reinforcing member for the knee panel.

On FIGS. 3 and 4 reference numerals 11 and 12 represent openings perforated in the reinforcing members 150 and 151 respectively for the purpose of reducing the weight of the reinforcing member 3.

Figure 2:
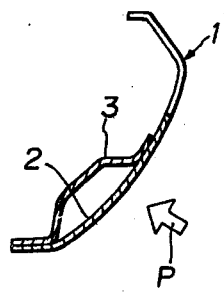
FIG. 2 is a sectional view of the knee panel taken along the line II—II in FIG. 1.

The reinforcing member 3 is preferably securely fixed, as shown in FIG. 2, to the lower inside portion 2 of the knee panel at a point which is ⅓ to ⅔ of the distance from the lower edge of the knee panel to the top edge of the knee panel.

FIGS. 5 and 6 represent unassembled and assembled states respectively of another embodiment of the knee panel according to the invention. The reinforcing member 13 is securely fixed to the knee panel, as seen from the front side of the vehicle, as shown in FIG. 6. The knee panel 14 is securely fixed to the vehicle body side through a side bracket 15, a center brace 16, an instrument panel reinforcing member 17, a center line bracket 18, and a floor bracket 19. These securing devices bear the load or impact force P applied to the knee panel 14 due to the driver's and/or passenger's knees making contact with the knee panel. Reference numeral 20 illustrates a front floor of the vehicle.

It is preferred that the knee panel 1, 14 be coated with buffer material such as urethane on the outer surface thereof and also with a vinyl chloride resin skin.

It should be understood from the foregoing description that since the knee panel 1, 14 is reinforced with the reinforcing member 3, 13 if a load or impact force P is applied to the knee panel by the driver's and/or passenger's knees, no local deformation occurs at the knee panel due to its rigidity. The knee panel restricts the movement of the driver's and/or passenger's knees and uniformly shares or bears the driver's and/or passenger's knee impact load or force, regardless of where the impact load or force is applied to the knee panel.

It should also be appreciated that since the knee panel can be sufficiently reinforced by means of the reinforcing member alone, the knee panel weight as well as the overall weight of the vehicle can be reduced.

FIG. 8 shows another preferred embodiment of the knee panel mounting structure, according to the present invention, in an unassembled state as seen from the front side of the vehicle. The knee panel 1 has a reinforcing member 3 having a dish shape in longitudinal cross section. The reinforcing member 3 is securely fixed at its peripheral edges 4a by a welding or the like to the lower inside portion of the knee panel 1. The reinforcing member 3 is perforated with openings 11 for the purpose of weight reduction.

The knee panel 1 is securely fixed or clamped by bolts at mounting portions 21 and 22 to a reinforcing member 23 of an instrument panel (not shown) through clamping holes 24, 25, and at the lower edge 26 and at one side end 27 to a side bracket which is securely fixed by bolts to a front pillar side of the vehicle.

The knee panel 1 is also securely fixed or clamped at the other side end 29 of its lower edge 26 to the horizontal mounting portion 31 of an L-shaped bracket 30 by bolts.

As shown in FIG. 9, the knee panel 1 is securely fixed at the other side end 29 of its lower edge 26 to the floor of the vehicle by means of a center brace 34 which is substantially vertically fixed on a floor bracket 33 secured to the floor 32 of the vehicle at the center portion of the vehicle, the vertical mounting portion 35 of the L-shaped bracket 30 being securely fixed to the center brace 34.

When driver's and/or passenger's knees make contact with the knee panel 1 from the direction designated by the arrow P in FIG. 10 in case of automotive collision or the like, the knee panel body 1a tends to deform around an actuating point which has the driver's and/or passenger's knees as its center. However the knee's impact load or force applied to the knee panel 1 does not locally deform the knee panel body 1a but is rather shared by the entire knee panel 1 and is transmitted through the side bracket 28 and the L-shaped bracket 30 to the vehicle body side.

The upward component force of the impact force designated by an arrow P acts as the tension load in a direction substantially in parallel with the horizontal mounting portion 31 and the vertical mounting portion 35 of the L-shaped bracket 35, that is, in the directions designated by arrows X and Y at the L-shaped bracket 30 seen in FIG. 8, so that the mounting portions of the knee panel 1 have a high rigidity strength against the impact force generated by the driver's or passenger's knee making contact with the knee panel.

It is noted that since the knee panel 1 should be securely fixed at one side end 27 of the lower edge 26 through its side bracket 28 to the front pillar side of the vehicle, the knee panel 1 also exhibits a high rigidity strength against the impact force.

As a result, the knee panel 1 will be only slightly deformed and displaced by the impact from the driver's and/or passenger's knees, and accordingly will restrict the movement of the driver's and/or passenger's knees.

Therefore, the L-shaped bracket 30 is provided in the knee panel mounting structure of the present invention at the vehicle center line side so as to remarkably increase the rigidity of the knee panel mounting structure as compared with the conventional knee panel mounting structure.

In summary, from the foregoing description it should be understood that the knee panel mounting structure of the present invention can direct the driver's and/or passenger's knee impact force, occurring upon contact or collision of the driver's and/or passenger's knees with the knee panel, toward the side ends of the lower edge of the knee panel and directly to the vehicle body side by means of applying the tension load to the L-shaped bracket. Accordingly, buckling or significant bending of the mounting members is eliminated. In conclusion, the knee panel mounting structure of the present invention can effectively minimize the deformation and movement of the knee panel and its supporting member, has a relatively simple light weight construction, and retains a wide space underneath and inside the knee panel which provides a wide installation space for a cooler unit or the like.

What is claimed is:

1. A knee panel for a front seat of a vehicle, comprising:
   (a) a substantially horizontally extending panel element, having a substantially convex shape when viewed in a longitudinal cross section of the vehicle, the convex outer surface of said element facing the front seat of the vehicle in the rearward direction of the vehicle, said panel element being securely fixed at an upper portion thereof to the lower portion of an instrument panel of the vehicle; of an instrument panel of the vehicle;
   (b) a substantially horizontally extending, substantially rigid one-piece reinforcing member substantially longitudinally coextensive with said panel element, said reinforcing member having substantially a dish shape when viewed in a longitudinal cross section of the vehicle, said reinforcing member being securely fixed at its peripheral edges to the lower inner surface of said panel element; and
   (c) a knee panel mounting structure comprising, (i) a side bracket securely fixing and supporting said knee panel element at the outer side end of the lower edge thereof;

(ii) an L-shaped bracket having horizontal and vertical mounting portions, said horizontal mounting portion of said L-shaped bracket being securely fixed to the inner side end of the lower edge of said knee panel element;

(iii) a floor bracket attached to the floor of the vehicle at a center line portion thereof; and (iv) a center line brace attached to said floor bracket, said center line brace being securely fixed to said vertical mounting portion of said L-shaped bracket, said reinforcing member and said knee panel mounting structure cooperating to provide substantially rigid support to said knee panel element so that local deformation of said knee panel element upon impact with the knees of vehicle occupants is eliminated and the movement of the vehicle occupants' knees upon impact with the knee panel is thereby restricted.

2. The knee panel of claim 1, wherein said reinforcing member is perforated with a plurality of openings;

3. The knee panel of claim 1, wherein said knee panel mounting structure further comprises a reinforcement member of the instrument panel of the vehicle securely fixed to said knee panel element at the upper mounting portions thereof, said upper mounting portions of said knee panel element being in the vicinity of both upper edges thereof.

4. The knee panel of claim 2, wherein said knee panel element is coated with a buffer material and a vinyl chloride resin skin.

* * * * *